United States Patent [19]

Gaertner et al.

[11] Patent Number: 4,957,525

[45] Date of Patent: Sep. 18, 1990

[54] COMPOSITE BUSHING DESIGN

[75] Inventors: Dean J. Gaertner, New Kensington; Eugene J. Palamara, Butler, both of Pa.

[73] Assignee: PPG Industries, Inc., Pittsburgh, Pa.

[21] Appl. No.: 453,875

[22] Filed: Dec. 20, 1989

[51] Int. Cl.⁵ .............................................. C03B 37/08
[52] U.S. Cl. ..................................... 65/1; 65/374.11; 65/374.12; 65/DIG. 4
[58] Field of Search .................. 65/1, 2, DIG. 4, 326, 65/344.11, 374.12

[56] References Cited

U.S. PATENT DOCUMENTS

| | | | |
|---|---|---|---|
| 3,566,888 | 1/1986 | Schaefer | 65/1 |
| 3,704,150 | 11/1987 | McEarthron | 65/1 |
| 3,846,865 | 7/1989 | Hinze | 65/1 |

Primary Examiner—Robert L. Lindsay
Attorney, Agent, or Firm—John E. Curley; Andrew C. Siminerio

[57] ABSTRACT

A fiber glass production bushing is described utilizing a flat precious metal plate which is preferably supported by a nonprecious metal support plate. The support plate has slots cut in it so that the rows of depending fiber glass tips can project through it and yet be electrically isolated from the support plate by an air gap. The side and end walls of the bushing are provided by the bushing block located above the tip plate.

15 Claims, 1 Drawing Sheet

COMPOSITE BUSHING DESIGN

The present invention relates to the manufacture of glass fibers. More particularly the present invention relates to improvements in the design of fiber glass forming bushings. Still more particularly the present invention relates to improvements in fiber glass bushings which substantially reduce the costs of the bushings by reducing the amount of precious metal required to construct a given sized bushing. Bushing fabrication costs are also substantially reduced by virtue of the novel design of the bushing of the instant invention.

BACKGROUND OF THE INVENTION

In the manufacture of glass fibers precious metal containers called bushings or feeders or spinnerets (hereinafter referred to as bushings) are used to form the glass fibers. The bushings are typically provided with a plurality of holes in the bottom sized such that, with appropriate pulling speeds applied to the fibers as they are formed from molten glass flowing through them from the bushing interior, glass fibers of any desired diameter may be produced. The molten glass flowing from the bushings is usually supplied from a forehearth connected to a glass melting furnace or in some instances from the upper part of a marble melt bushing. A typical marble melt bushing is shown on pages 101 and 102 of the book "The Manufacturing Technology of Continuous Glass Fibers", by K. L. Lowenstein, Elsivier Publishing Co. N.Y. 1973. A typical glass melting furnace, associated forehearth and the bushings attached thereto is shown on pages 61-63 of the same book. The holes in the bushing have tips or nozzles (hereinafter tips) depending from them and they are formed by various methods of manufacture. A description of the function of the tips and their methods of manufacture is provided on pages 89-99 of the above referred to Lowenstein text.

In constructing bushings and the tips used on them the metal used must be one which is substantially inert to molten glass which, during the formation of glass fibers, is constantly in contact with the bushing interior and the tips. The bushings and the tips are thus typically fabricated from precious metals and alloys thereof. In general platinum and alloys of platinum are used for this purpose with platinum-rhodium alloy being preferred. The rhodium content of this preferred alloy is usually 20 percent by weight of the alloy, with the balance of the weight being platinum.

As will be appreciated, the use of precious metals introduces into the fiber glass manufacturing art considerable costs even though the precious metals are not lost during the manufacture of the glass fibers to any appreciable extent. Thus the normal bushings used in glass fiber manufacture, besides having a bottom tip plate, are provided with side walls and electrical connectors built into them that require welding to the bottom tip plate in the assembly thereof. The tips from which the glass fibers form are typically coined and deep drawn from the tip plate. These forming operations introduce fabrication steps that are time consuming and expensive. They also add considerably to the cost of the fiber forming operation in general.

For the above reasons, therefore, a need exists in the art to provide for simpler bushing constructions that will result in a shortening of the normal fabrication times required to construct a production bushing. Still further, the need to reduce substantially the quantity of precious metal used in a given bushing also exists.

By virtue of the instant invention, a bushing is provided which uses a precious metal plate for the tip section. The bushing further is one which substantially reduces the normal precious metal requirements of a glass fiber forming bushing of a given size over that which would normally be required. Fabrication costs for bushings constructed according to the invention are also reduced substantially. The invention, therefore, provides the art with a much sought after goal of substantially reducing the large capital investment in precious metals currently needed to sustain a modern fiber glass production facility while also reducing labor costs.

SUMMARY OF THE INVENTION

Thus, in accordance with the present invention a novel bushing is provided which is relatively simple in construction, requires less fabrication time to assemble and which utilizes considerably less precious metal than would be used to construct a conventional bushing having comparable productive capabilities.

The bushings of the instant invention are characterized by having a flat planar precious metal plate which is provided with the requisite number of holes or orifices to produce the desired strand. The orifices have appropriate diameters for the filaments desired, and each is provided with a downwardly depending hollow tip through which molten glass passing through the orifices flows to form the glass fibers. The flat plate precious metal is attached to a container preferably of refractory material which forms the sidewalls. In the preferred bushing the refractory walls contacting the flat plate are lined with precious metal at the interface between the two and along the sides of the refractory walls that are exposed to the molten glass. The precious metal plate forms the bottom of the bushing. Molten glass is passed to the container from a suitable source such as a forehearth which is connected to and is fed by a suitable melter. The underside surface of the precious metal plate, i.e. the side of the plate that is not in contact with the molten glass, is coated with a thin layer of insulator, preferably an inert chemically resistant ceramic. A second substantially flat plate coextensive with the precious metal plate is provided below it and is firmly attached to it. This second plate also has a thin layer of insulating material, again preferably a ceramic on the surface that abuts the surface of the precious metal plate. The second plate also is provided with holes or with slots corresponding in location to the tips depending from the precious metal plate and being sized to provide an insulation air gap around each of the tips in the bushing. Where slots are employed to provide the air gap between the busing tips, they are typically cut in the second plate to provide the gap necessary for all of the tips in one or more rows of tips depending from the bushing and passing through the plate. As an alternative, each tip can be passed through a corresponding hole drilled in the second plate as long as it is large enough to provide an insulating air gap around the tip.

The assembly of the two plates with the insulation between provides a bushing which has a average thickness of about 0.090 inches or less, while the average bushing in production today may have a tip plate thickness of about 0.060 to about 0.080 inches all of which is currently precious metal. In the bushing assembly of this invention the precious metal plate will typically be on the order of 0.010 to 0.030 inches in thickness.

The second plate can be a metal such as steel, nickel, Inconel, ceramic, fired lava such as G stone and the like. In any event this second plate which is used for support can be of a minimal thickness also, i.e., about 0.030 to about 0.060 inches. Whatever metal or ceramic that is selected for the second plate it should be a material that possesses a creep strength at least equivalent to that possessed by an 80-20 platinum-rhodium alloy and preferably having some resistance to oxidation when exposed to high temperatures. A preferred metal that meets this criteria is a nickel alloy Inco M A 754 sold by Inco International Inc., Huntington, W.V. The "G" stone or Wonderstone, as it is also called in the art (see U.S. Pat. No. 3,070,990 for a more complete description), forms a satisfactory ceramic.

The second plate which is exposed to the tips and the molten glass emanating from them during the operation of the bushing of the instant invention is supported around its periphery by the placement of a cooling loop against the undersurface of the plate. A coolant is circulated through the loop during the operation of the bushing. The cooling loop which removes heat rapidly from the perimeter of the precious metal abutting against the second plate around its perimeter also freezes molten glass at the interface of the bushing tip plate and the bushing block by this cooling.

The precious metal plates used to form the tip plate of the bushing of this invention are typically precious metals such as platinum, palladium, rhodium, rhenium, ruthenium, iridium and alloys thereof. Platinum-rhodium alloys which have been employed for this purpose are 10 and 20 percent rhodium by weight, with the balance platinum. These are preferred alloys for use in bushing fabrication. The use of grain stabilized precious metals is also within the contemplation of the invention as regards the construction of the precious metal plates. Grain stabilized platinum or platinum-rhodium alloy of other grain stabilized platinum containing precious metal alloys may be used.

BRIEF DESCRIPTION OF THE DRAWINGS

The invention will now be described with reference to the accompanying drawings in which.

DETAILED DESCRIPTION OF THE INVENTION

Figure 1:
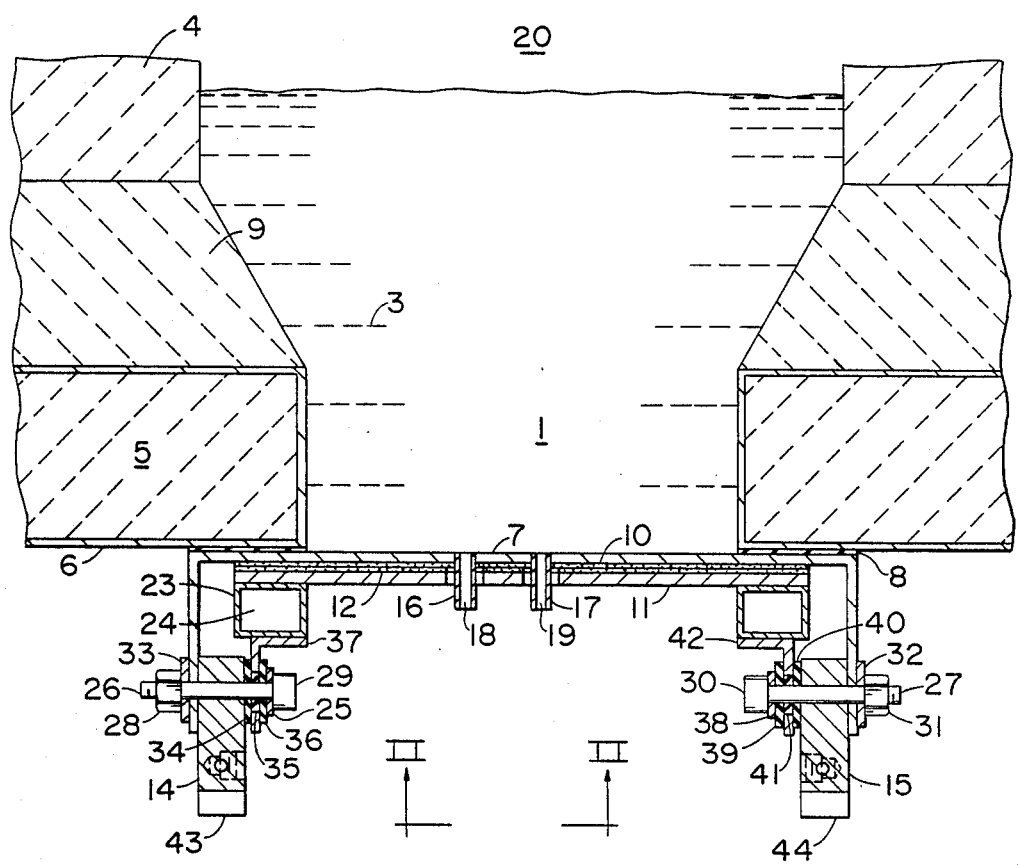
FIG. 1 is a side elevation in section of a production bushing showing the bushing tips (only two rows of tips shown for simplicity) and the electrical supply connection.
Figure 2:
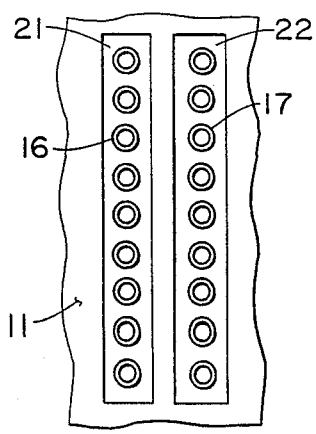
FIG. 2 is a bottom plan view of the bushing of FIG. 1 taken along line II—II.

Turning to the drawing, both FIGS. 1 and 2, there is shown a bushing generally indicated as 1, which is a container open at its upper end and having a bottom or tip plate (hereinafter tip plate) 7 and side and end walls formed from bushing blocks 5 which are provided with a precious metal lining 6. The jointure of the tip plate 7 and the lining 6 of bushing blocks 5 have a gasket 8 around the periphery of the tip plate to seal these structures from molten glass 3. The molten glass 3 enters the bushing through a forehearth opening 20, formed by forehearth blocks 6 and the associated flow blocks 9 which rest on the bushing blocks 5. The flow blocks 9 are usually sloped, as shown, to assist glass flow to the bushing 1.

The tip plate 7 is bent downwardly at its ends and each end is provided with an electrical connection assembly used to connect the bushing to a power source. The tip plate 7 on its undersurface (i.e., the major surface opposite the major surface exposed to molten glass 3) is coated with a ceramic electrical insulator 10 which extends, as shown, substantially beyond the tip plate area exposed to the molten glass. If desired, the ceramic insulator 10 can be extended beyond the area shown on the drawing but would not be extended below the point at which tip plate 7 contacts the connector blocks 14 and 15. Located below the tip plate 7 is a support plate 11 having on its upper major surface (i.e., the major surface closest to the tip plate 7) a ceramic electrical insulator 12. As shown in FIG. 1 therefore, when the bushing 1 is in assembled form, the insulators 10 and 12 are in intimate contact with each other and they electrically insulate the tip plate 7 from the support plate 11. Tip plate 7, as shown in the drawings, has two rows of tips, shown in FIG. 1 as tips 16 and 17, each having a generally centrally located hole or channel 18 and 19 (hereinafter holes) respectively. The holes 18 and 19 are open to the glass 3 in the bushing 1 at one end and the atmosphere below plate 11 at the other end. As shown in FIG. 2, the tips 16 and 17, which are arranged in rows, are located in slots 21 and 22, cut out of the support plate 11, which thereby provides an opening for the tips to pierce from the bushing to the atmosphere and also provides a very important insulating air gap around each of the tips 16 and 17 shown in the two rows.

A cooling loop 23, preferably constructed of metal, is provided around the periphery of the support plate 11. During the operation of the bushing 1 cooling fluid, usually plant process water, is circulated through the interior chamber 24 of the cooling loop 23 and heat is thereby extracted from the support plate around its periphery. This heat removal insures that molten glass entering the gasket 8 area of the bushing sidewalls where the blocks 5 mate with the tip plate 7 is chilled to a sufficient degree to solidify that jointure, thereby sealing the bushing from any molten glass leaks.

The bushing 1 at either end is connected by bolts 26 and 27 to the electrical connector blocks 14 and 15 respectively. Thus bolt 26 has a head 29 and threaded end on which a nut 28 is threaded. Similarly, bolt 27 is provided with a head 30 and a threaded end on which nut 31 is affixed. Underneath the nut 28, an electrically conductive plate 33 is provided which contacts a substantial portion of the surface of tip plate 7 at its jointure therewith to insure good electrical conductivity to that side of the tip plate. On the other side of the block 14 insulated washers 34 and 36 are placed on either side of bracket 37 which has an insulating washer 35 surrounding bolt 26. These are all drawn tightly against the connector block 14 when nut 28 is tightened to tightly fit the block to the side of the bushing tip plate 7. Washer 35 insulates the bracket 37 electrically from the cooling loop 22 and, of course, by that arrangement from the support plate 11. Bracket 37 is used to support the cooling loop 22 and to hold it tight against the support plate 11.

On the other side of the bushing 1, a similar arrangement is shown. There bolt 27 has a nut 31 firmly tightened on its threaded end which firmly affixes conductive plate 32 to tip plate 7. The head 30 of the bolt 27 is pulled against a metal washer 38, insulating washers 39 and 40 and the insulating washer 41 surrounding the bolt 27 in the area where it pierces through the bracket 42. At the bottom of connectors 14 and 15, ears or tabs 43 and 44 respectively, are provided to allow them to be connected to a suitable power supply.

The ceramic coatings used to provide the insulating surface 10 and 12 are typically materials such as alumina, zirconia, titania and the like usually applied by high temperature coating process such as flame spraying the powdered material onto the surface of the metal plates 11 and 7 where desired. Descriptions of typical applications and materials that may be used are shown in U.S. Pat. Nos. 3,859,070 and 3,685,978. As long as the material is electrically insulating and can be applied in thin layers, it is satisfactory.

While the invention has been described with references to certain specific embodiments, it is not intended that it be limited thereby except insofar as appears in the accompanying claims.

We claimed:

1. A glass fiber forming bushing comprising a flat, planar precious metal plate forming the bushing bottom and having an upper and lower surface, side walls attached to said bushing bottom forming a container for molten glass, a plurality of holes in said precious metal plate, a fiber forming tip depending from each said hole and extending below the lower surface of said precious metal plate, a non-electrically conductive coating covering the lower surface of the said precious metal plate, a second metal plate essentially coextensive with said precious metal plate and providing mechanical support thereto and also provided with a plurality of holes therein, said second plate being positioned against the said precious metal plate so that the tips depending from the precious metal plate pass through the holes in said second plate, said second metal plate having an upper and a lower surface, the upper surface of said second plate being covered with a non-electrically conductive coating which is in contact with the coating on the precious metal plate lower surface, both non-electrically conducting surface forming an insulating zone between the precious metal plate and the second metal plate, an electrically insulating air gap being provided between walls of the holes in the second metal plate and the outside of each of said tips passing through said holes to thereby isolate them electrically from said second plate, means to provide electric current to the said precious metal plate and means to pass molten glass through said glass fiber forming bushing.

2. The apparatus of claim 1 wherein said precious metal plate is selected from the group consisting of platinum, rhodium, palladium, ruthenium, iridium and alloys thereof.

3. The apparatus of claim 2 wherein the precious metal plate is a grain stabilized alloy.

4. The apparatus of claim 3 including means to cool the said second plate around its periphery continuously during the flow of molten glass through said tips.

5. The glass fiber bushing of claim 1 wherein said tips are arranged in rows and said holes in the second plate are rows of slots cut therein and through which said tips pass, the spacing between the tips in the slots providing an insulating air gap between the tips to electrically isolate them from the second plate.

6. The apparatus of claim 1 including means to cool the said second plate around its periphery continuously during the flow of molten glass through the tips.

7. The apparatus of claim 2 including means to cool the said second plate around its periphery continuously during the flow of molten glass through said tips.

8. A glass fiber forming bushing comprising a flat planar precious metal plate having a plurality of orifices therein with downwardly depending tips, molten glass compatible sidewalls above said precious metal plate and forming a containing therewith, means to introduce molten glass to said container, means to supply electricity to said precious metal plate, a support plate of non-precious metal material contiguous and coextensive with said precious metal plate and having orifices therein through which said tips pass, a non-conductive coating on the contiguous surfaces of the precious metal plate and the non-precious metal material plate of sufficient depth to electrically isolate said support plate and said precious metal plate, means in contact with the support non-precious metal plate to cool it on a continuous basis when molten glass is being passed through said tips and an air gap around each of said tips and the non-precious metal plate of sufficient width to electrically insulate them from the non-precious metal plate.

9. The apparatus of claim 8 wherein the precious metal plate is formed from a member of the group consisting of platinum, rhodium, palladium, ruthenium, iridium and alloys thereof.

10. The apparatus of claim 9 wherein the member of the group is a grain stabilized member.

11. The apparatus of claim 8 wherein the thickness of the precious metal plate and the non-precious metal material plate including the non-conductive coating thereon is about 0.090 inch.

12. The apparatus of claim 1 wherein the thickness of the precious metal plate and the second non-metal plate including the non-conductive coating thereon is about 0.090 inch in the assembled bushing.

13. The bushing of claim 1 wherein the coatings on the precious metal plate and the non-precious metal plate have a thickness capible of electrically insulating one plate from another.

14. The apparatus of claim 8 wherein the said coatings form an insulation layer between the precious metal plate and the non-precious metal have a thickness capible of electrically insulating one plate from another.

15. The glass fiber bushing of claim 8 wherein said tips are arranged in rows and said orifices are slots in the support plate through which the tips pass through, the spacing of the tips in a given row passing through a given slot providing an electrical insulating air gap between the tips and the support plate.

* * * * *